Nov. 7, 1933.  A. G. WILLIAMSON  1,933,780
TRAIN CONTROL SYSTEM
Filed Aug. 25, 1927   5 Sheets—Sheet 1
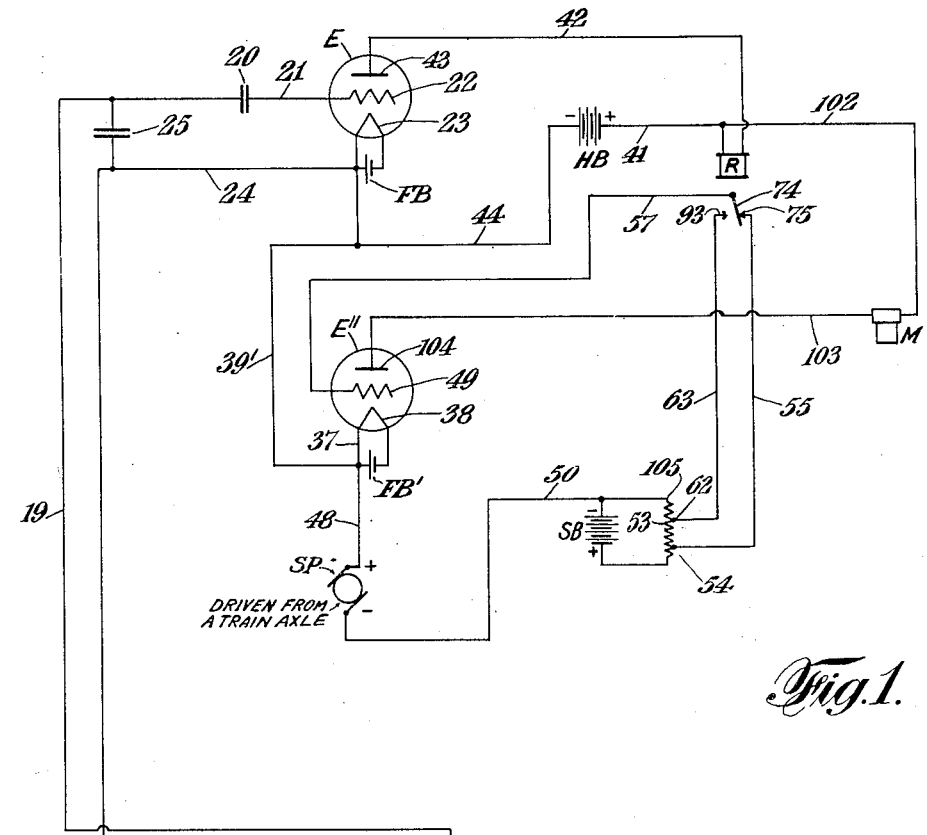
Fig.1.
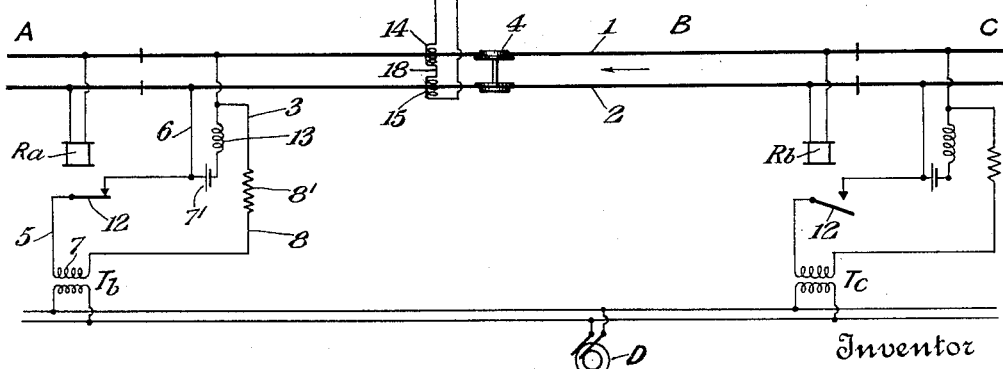
Inventor
Arba G. Williamson
By his Attorney Nov. 7, 1933.   A. G. WILLIAMSON   1,933,780
TRAIN CONTROL SYSTEM
Filed Aug. 25, 1927   5 Sheets-Sheet 2

Inventor
Arba G. Williamson
By his Attorney

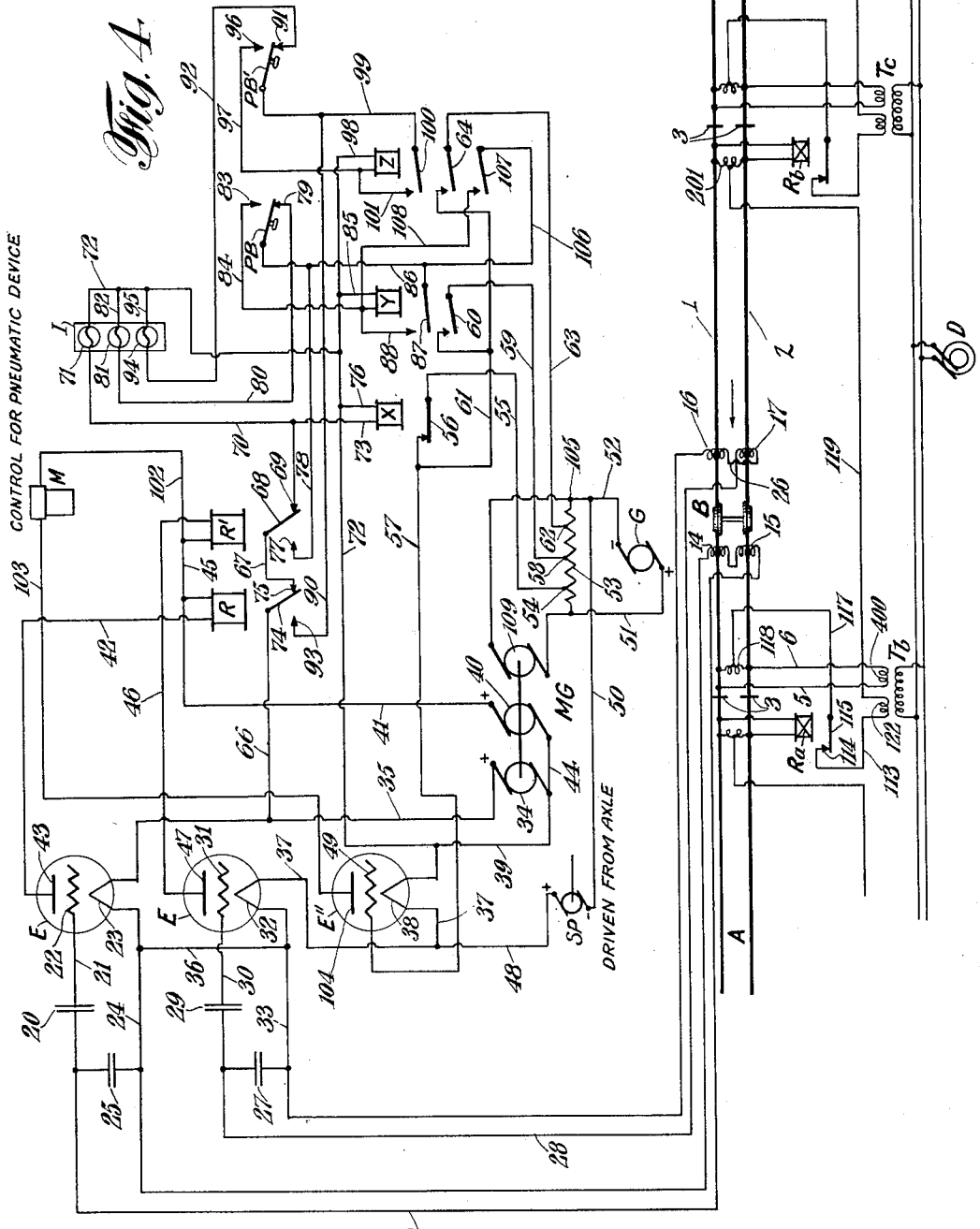

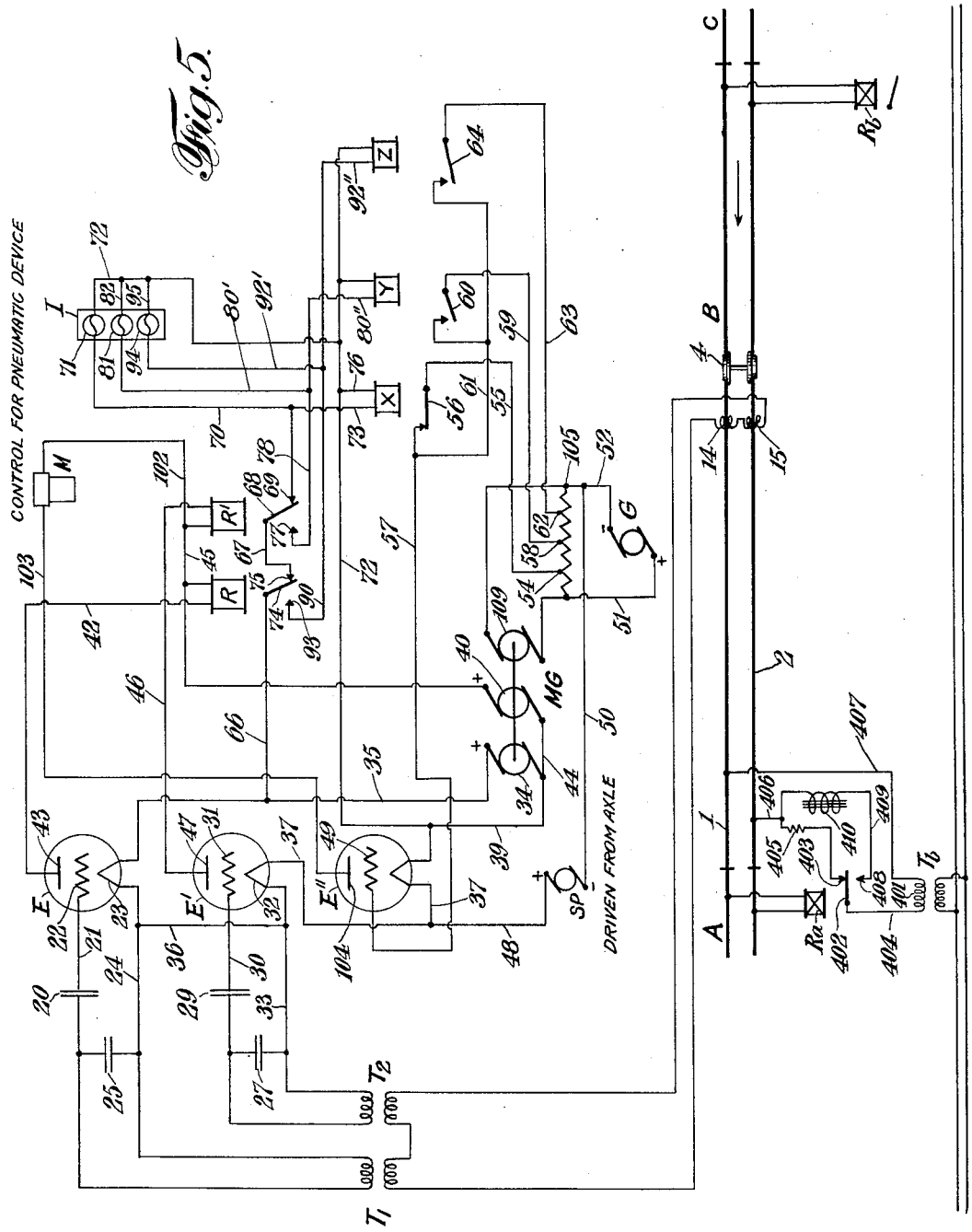

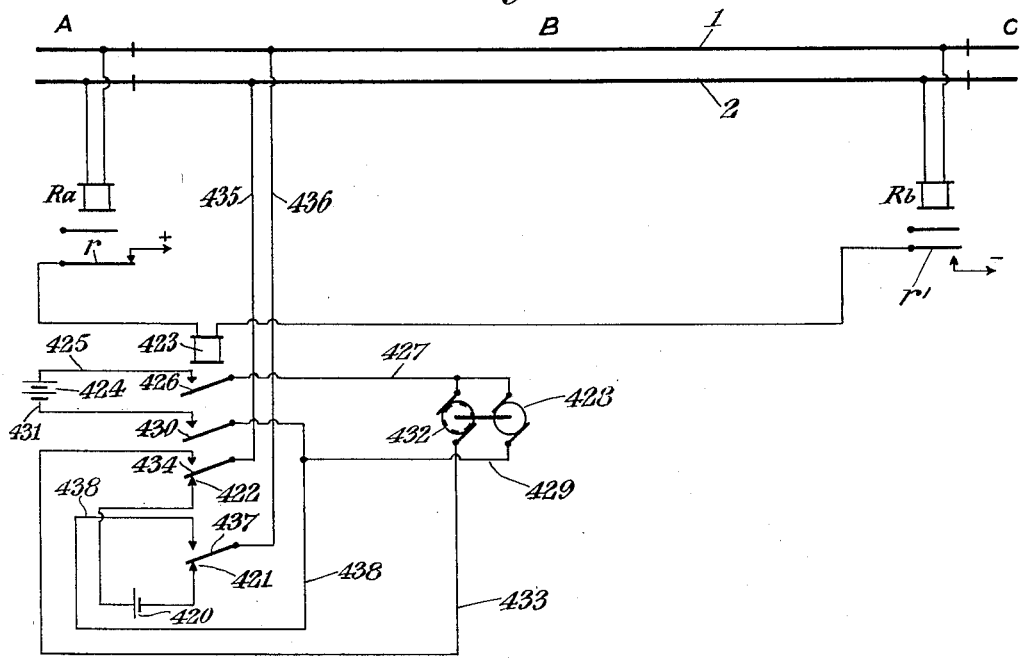

Patented Nov. 7, 1933

1,933,780

UNITED STATES PATENT OFFICE 1,933,780

TRAIN CONTROL SYSTEM

Arba G. Williamson, Carnegie, Pa., assignor, by mesne assignments, to The Union Switch & Signal Company, Swissvale, Pa., a corporation of Pennsylvania Application August 25, 1927. Serial No. 215,318

17 Claims. (Cl. 246—63)

The present invention relates to train control systems and has for its main object and feature the control of a train whether by signal or brake setting or both by means of a simple and reliable character.

In the accompanying drawings the invention is disclosed in several concrete and preferred forms in which Fig. 1 is a diagrammatic view of track-way and cab means embodying one form of the invention.

Fig. 4 is a diagrammatic view of track-way and cab means embodying a more complex form of the invention.

Fig. 5 is a diagrammatic view of track-way and cab means showing another complex form of the invention.

Fig. 6 is a diagrammatic view of a modified form of track-way means to be used in place of the corresponding parts shown in Fig. 1.

Figure 2:
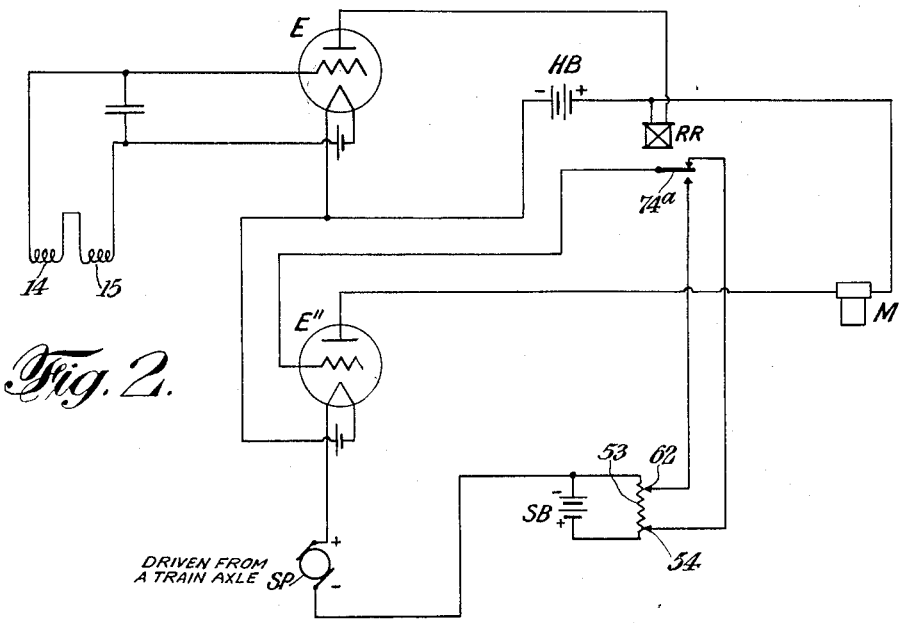
Fig. 2 is a diagrammatic view of a modified form of cab means to be used in place of the corresponding parts shown in Fig. 1.

In the simple exemplification of the invention illustrated in Fig. 1, the indicating means may be either signals or brake-setting means or both and may be considered as being represented by magnet valve M. From another point of view magnet valve M and/or electron tube E'' may be considered as a train-carried translating device which is controlled by two opposed sources of power here represented by battery SB and generator SP. SP is, in this instance, a magnetogenerator of the permanent magnetic field type and the voltage generated by it is directly proportional to its speed. This generator supplies voltage directly proportional to the speed of the train in miles per hour by being driven from an axle or other moving part of the train, and the gear ratio is here of such character that at seventy miles per hour thirty volts are delivered, at thirty-five miles per hour fifteen volts are delivered, and at fifteen miles per hour six and one half volts are delivered, by said generator.

Generator SP and battery SB are included in the grid-filament circuit of electron tube E'' but are so arranged that the voltage supplied by the two power sources oppose each other as will be evident from the plus and minus signs indicated in Fig. 1. The positive brush, of generator SP, is connected to filament 38 of tube E'' by means of wires 48 and 37, and the negative brush is connected to grid 49 of tube E'' by means of wire 50, resistance 53, wire 63 or 55, depending upon the position of armature 74, and wire 57. Resistance 53 is connected across the terminals of battery SB, and has two taps 62 and 54. Let us assume that the voltage of battery SB is thirty-two volts and that tap 54 is so located that the drop between 54 and 105 is thirty volts. Therefore, as long as armature 74 is in the right hand position (Fig. 1) grid 49 of tube E'' will be thirty volts positive with respect to filament 38—so far as resistance 53 and battery SB are concerned. Let us further assume that tap 62 is so located that the drop between 62 and 105 is six and one-half volts, so that whenever armature 74 is in the left hand position (Fig. 1) grid 49 of tube E'' is six and one-half volts positive with respect to filament 38—so far as resistance 53 and battery SB are concerned.

As previously set forth, generator SP develops thirty volts when the train is traveling at a speed of seventy miles per hour and this voltage supplied to the filament of E'' opposes the voltage supplied by battery SB via tap 54 and wire 55, armature 74 and wire 57 to grid 49. Therefore, so long as the speed of the train is below seventy miles per hour, grid 49 will be positive with respect to filament 38. If the speed is seventy miles per hour there will be no difference in potential and if it rises above seventy miles per hour grid 49 will be negative with respect to filament 38. If armature 74 is in the left-hand position then battery SB supplies only six and one half votes to grid 49 via tap 62, wire 63, armature 74 and wire 57, and the same relation that exists between thirty volts supplied by generator SP and thirty volts supplied by way of tap 54, will prevail as between six and one half volts supplied by generator SP and a like number of volts supplied by way of tap 62.

Electron tube E'' is a three element tube having plate 104, grid 49 and filament 38, the latter heated by battery FB', and has, in addition to the grid-filament circuit already described, a plate-filament circuit here consisting of the following elements: Battery HB, wires 41 and 102, magnet valve M, wire 103, plate 104, filament 38, wires 37, 39' and 44 back to battery HB. We will assume that the voltage delivered by battery HB and the resistance of the coil of M are such that, when grid 49 has a positive potential of thirty volts with respect to filament 38, the value of current flow in the plate-filament circuit is .040 amperes, and that when grid 49 has the same potential as filament 38 the value of the current flow in the plate-filament circuit is reduced to .010 amperes. Magnet M, through the coil of which this current flows, is so adjusted that its armature (not shown in Fig. 1) is released to open a circuit when the current value drops to .010 amperes, and it will therefore be understood that, when the voltage delivered by generator SP is equal to or overcome the voltage supplied by battery SB, the coil of said magnet M is not sufficiently energized to hold its armature up. In other words: in the example of values given, and with armature 74 in the right hand position (Fig. 1), when the speed of the train reaches or exceeds seventy miles per hour a circuit controlled by M is opened. So likewise when armature 74 occupies the left hand position (Fig. 1) so that only six and one half volts are delivered to grid 49 by battery SB via tap 62 then if the speed of the train reaches or exceeds, say fifteen miles per hour, the value of current flow in the plate-filament circuit will also drop to .010 amperes and magnet M will become sufficiently deenergized to release its armature.

I have assumed a circuit to be controlled by M and such circuit may in turn control a signal or a brake setting valve or both, or, in accordance with practice in the art it may control a fluid circuit and may in itself constitute means to actuate either a signal or the brakes as will be understood.

Any suitable means may be employed to intermittently or otherwise control armature 74 in response to a change in traffic conditions of the track-way, but, preferably, such means exercise a continuous control and include the traffic rails. As here shown by way of illustration, armature 74 is polarized and is controlled by relay R which later is included in the plate-filament circuit of electron tube E, said circuit being as follows: From battery HB, to wire 41, coil of relay R, wire 42, plate 43 of tube E, filament 23 of the same, and wire 44 back to battery HB. Electron tube E is here a three-element tube and contains a grid 22 in addition to the plate and filament previously described. Filament 23 is heated by battery FB. Tube E has a grid-filament circuit composed of coils 14 and 15 (carried in series by train 4 and in inductive relation to traffic rails 1 and 2) wire 19, condenser 20, wire 21, grid 22, filament 23, wire 24 and back to coils 14 and 15. 25 is a tuning condenser bridging this circuit. Traffic rails 1 and 2 are arranged in blocks, A, B, C etc., by suitable insulation and said rails are supplied with a track-circuit here consisting of a battery 7' connected through impedance coil 13 to the rails at the outgoing end of each block, and a track relay Ra (or Rb etc.) connected to the rails at the ingoing end of each block. The traffic rails are supplied with a second current derived from generator D over suitable line wires to track transformers Tb, Tc etc., the circuit from each transformer to the rails being as follows: secondary 7 is connected to rail 1 by means of wire 8, resistance 8' and wire 3; and to rail 2 by means of wire 5, armature 12 (under control of a relay as Ra of the block in advance) and wire 6. The impedance coil 13 serves to choke the flow of alternating current without impeding the flow of direct current, and resistance 8' serves to prevent a short-circuiting of the battery by the secondary of the track transformer. Track relays Ra, Rb are of the direct current type and therefore respond only to current supplied by battery 7' and not to current supplied by the transformer. When a train as 4 is in a block, as B, track relay Rb is shunted thereby dropping armature 12 and opening the circuit from transformer Tc in the block behind. Current from transformer Tb is likewise shunted by the wheels and axles of the train and will induce a current flow in coils 14 and 15 and therefore in the pick-up or grid-filament circuit of tube E rendering the grid negative. This will choke down the current in the plate-filament circuit from a value of 1.00 to a value of 0.40. Should a train now enter block C, then the coils 14 and 15 of such second train would have no current induced in them and consequently the value of the plate-filament circuit current would rise from 0.40 to 1.00. So also should the second train enter block B while the latter is still occupied, no current would be induced in coils 14 and 15 of such second train. Relay R, included in the plate-filament circuit of tube E, is a direct-current polarized relay and is so biased that, with no current or a very weak current flowing in the plate-filament circuit, armature 74 will always revert to its left hand position (Fig. 1). With a direct current of the proper polarity and of the proper value, say 0.40, flowing, then armature 74 is forced over to the right-hand position (Fig. 1); and with a current of higher value, say 1.00, flowing armature 74 is again forced back to the left-hand position. Tube E therefore acts as a detector, the detail description of which, together with a full disclosure of the construction of all the parts, and of alternate forms, is disclosed in application Ser. No. 147,403, filed November 10, 1926.

It will now be evident that under safe traffic conditions relay 74 will be in engagement with contact 75 and that the train can run unhindered up to a speed of say seventy miles per hour, but that if this speed is exceeded train control, whatever its character may be, will be initiated. So likewise, under adverse traffic conditions, relay 74 will be in engagement with contact 93 and the train can then run freely up to a speed of fifteen miles per hour but not higher without initiating train control.

I desire it to be distinctly understood that when the invention is embodied in a construction in which an electron tube as E is employed to control an influence from the track-way, it is not essential that said electron tube be used merely as a detector in the manner outlined above. It may equally as well be utilized as an amplifier if so desired. Fig. 2 shows such an arrangement. In this form of the invention the track-way equipment is not shown but it could be the same as that of Fig. 1. The circuits associated with tube E'' could also be the same as those of Fig. 1, but relay RR is here an alternating current relay and condenser 20 of the pick-up circuit of tube E could be omitted, or, it might be a leaky condenser as will be understood. With this construction, current from battery HB will not pick up armature 74$^a$ of relay RR but when an alternating current is induced in coils 14 and 15 and in the pick-up circuit of tube E the grid thereof is alternately made positive and negative thereby imparting an alternating component to the current flowing in the plate-filament circuit of tube E, and the current so modified is sufficient to energize coil of relay RR and to pick up armature 74$^a$.

Figure 3:
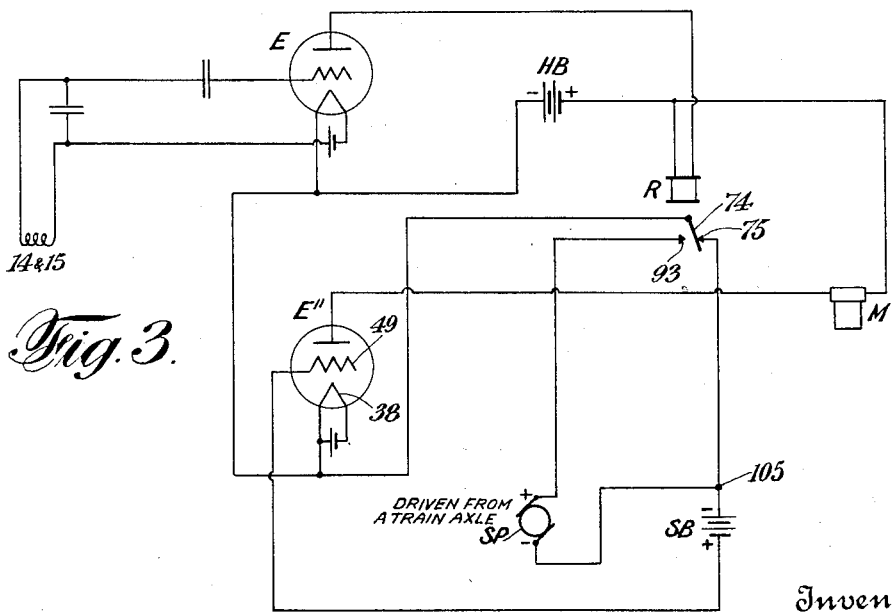
Fig. 3 is a diagrammatic view of a second modified form of the cab means shown in Fig. 1.

It is not desired under all circumstances to have a construction that gives an indication in the cab of the train or which controls its speed under clear traffic conditions. In such cases, the very simple form of the invention shown in Fig. 3 may be employed. In this construction the track-way equipment may be that shown in connection with Fig. 1, and the cab equipment is also substantially the same as that of Fig. 1, the main difference being that resistance 53 and its taps are omitted. In Fig. 3, battery SB has a voltage of six and one half volts and has its negative pole connected to contact 75 so that when armature 74 is in the right hand position (Fig. 3) said negative pole is connected to filament 38 of tube E''. The positive pole of battery SB is connected to grid 49 of tube E''. Magneto SP has its negative brush connected to the negative pole of battery SB and its positive brush connected to contact 93. Under safe traffic conditions, armature 74 will be in the right-hand position (Fig. 3) and battery SB will render grid 49 positive with respect to filament 38 by an amount equal to six and one half volts. This is sufficient to permit a current to flow in the plate-filament circuit, including the coil of M, to properly energize said coil to hold up an armature (not shown) or to hold a valve closed. The train may therefore proceed at any speed desired by the engineer. When, on the other hand, traffic conditions are dangerous, armature 74 moves into engagement with contact 93 and the voltage developed by SP becomes opposed to that of battery SB and if at fifteen miles per hour magneto SP generates six and one half volts, then there will be no difference of potential between grid 49 and filament 38 and therefore a current of insufficient value to properly energize M will flow in the plate-filament circuit of tube E'' and train control will be initiated.

In Fig. 4 is shown a somewhat more elaborate form of the invention than is shown in Fig. 1. Here, instead of battery SB there is utilized a generator G (which may conveniently be a headlight turbo-generator) and across the leads 51 and 52 of this generator is placed resistance 53 having three taps 54, 58 and 62 that are connected to wire 57, under different traffic conditions, which wire leads to grid 49 of tube E''. Magneto SP is connected with its positive brush by wires 48 and 37 to filament 38 of tube E'' and with its negative brush by wire 50 to wire 52 leading from the negative side of generator G. Let us assume that at seventy miles per hour magneto SP delivers thirty volts, at thirty-five miles per hour fifteen volts and at fifteen miles per hour six and one-half volts and that taps 54, 58 and 62 are so located with respect to point 105 that generator will deliver similar voltages. When relay X is energized armature 56 will be in the up-position and thirty volts will therefore be supplied from tap 54 over wire 55, armature 56 and wire 57 to grid 49 and therefore so long as the train runs below seventy miles per hour M will remain energized. When relay Y is energized, armature 60 will be in the up-position and fifteen volts will therefore be supplied from tap 58 over wire 59, armature 60, wires 61 and 57 to grid 49 and therefore so long as the train runs below thirty-five miles per hour M will remain energized. When relay Z is energized, armature 64 will be in the up-position and six and one-half volts will be supplied from tap 62 over wire 63, armature 64 and wires 61 and 57 to grid 49 and therefore so long as the train does not exceed fifteen miles per hour M will remain energized.

Instead of battery HB of Fig. 1 there is employed in the construction of Fig. 4 a motor generator MG having motor 109 energized from generator G by means of leads 51 and 52. The generator end of motor generator MG has two windings 34 and 40, the latter of which supplies current to M and the plate-filament circuit of tube E'' as follows: winding 40, wires 41, 45 and 102, M, wire 103, plate 104, filament 38, wires 39 and 44 back to winding 40. As the construction shown in Fig. 4 gives three position indications there is, in the present case, employed an electron tube E' in addition to tube E and two relays R and R' that are included in the plate-filament circuits of tubes E and E' and these latter circuits can conveniently be energized from winding 40 as follows: winding 40, wire 41, coil of relay R, wire 42, plate 43 of tube E, filament 23, wire 36, filament 32, wire 37, filament 38 and wires 39 and 44 back to winding 40; and again from wire 41 to wire 45, coil of relay R', wire 46, plate 47 of tube E', filament 32 and so back to winding 40. Relays R and R' are of the same character as relay R of Fig. 1 and it will be understood that so long as a current of an intermediate value of say 0.40 flows in the plate-filament circuits of tubes E and E' said relays remain energized to hold armatures 74 and 68 in the right-hand position (Fig. 4) but that if current either increases or decreases with respect to this value then in the case of tube E armature 74 of relay R will move to its left hand position (Fig. 4) and in the case of tube E' armature 68 will move to the left hand position (Fig. 4). The filaments of tubes E, E' and E'' can conveniently be heated from generator winding 34 over the following circuit: winding 34, wire 35, filament 23 of tube E, wire 36, filament 32, wire 37, filament 38, and wire 39 back to winding 34. Said winding 34 also supplies current to relays X, Y and Z and to certain signaling devices which will now be described. M is here a brake-setting means, the signaling device being indicated at I and consisting here of lamps 71, 81 and 94 which, together with relays X, Y and Z, are controlled by relays R and R'. One circuit passes from winding 34 to wires 65 and 66, armature 74, contact 75, wire 67, armature 68, contact 69, wire 70, green or proceed signal lamp 71, wires 72 and 39 back to winding 34. In parallel with signal lamp 71 is relay X, wires 73 and 76 extending from said relay to signal 71 and wire 72. Thus when both relays R and R' are so energized as to hold armatures 74 and 68 in the right-hand position (Fig. 4) green lamp 71 is lighted and X is energized thereby permitting the seventy miles per hour speed. If now current of an intermediate value no longer flows through the coil of R', that is, the current is either increased or diminished, armature 68 will move into engagement with contact 77 and the circuits through lamp 71 and relay X will be broken. When this occurs, however, another circuit will be established as follows: from winding 34 to armature 68 as previously described, then contact 77, wire 78, push button PB, contact 79, wire 80, yellow or caution lamp 81, wires 82 and 72 back to winding 34. It will be understood that relay Y could be placed in parallel with caution lamp 81 in a manner similar to the arrangement of lamp 71 and relay X, but it so happens that, in this particular construction shown, a manual act is required on the part of the engineer to energize relay Y. This manual act consists in raising push button PB to momentarily close the contact at 83, when current will flow over wire 84 to coil of relay Y and from the latter by wire 85 to wire 72 and so back to winding 34. The engineer immediately returns push button PB into engagement with contact 79 but relay Y having been energized, will remain so by reason of the fact that armature 87 has been picked up and current to said relay will continue to flow from wire 86, armature 87, wire 88, coil of relay Y and wire 85 to wire 72. The energization of relay Y also raises armature 60 thereby permitting the thirty-five mile per hour speed. In other words, if armature 68 of relay R' moves to the left hand position (Fig. 4) then caution or yellow light 81 will be displayed and if the engineer does nothing the brakes will be applied by M but if he is on the alert and manipulates push button PB he may proceed at a speed up to thirty-five miles per hour without any application of the brakes by M. If now current of an intermediate value no longer flows through the coils of relay R, that is, the current is either increased or diminished, armature 74 will move into engagement with contact 93 and the circuits through lamp 71 and relay X or through lamp 81 and relay Y, as the case may be, will be broken and another circuit will be established as follows: from winding 34 to armature 74, as previously described, then contact 93, wire 90, push button PB', contact 91, wire 92, danger or red light 94, and wires 95 and 72 back to 34. Relay Z could be placed in parallel with danger lamp 94 in a manner similar to the arrangement of lamp 71 and relay X, but, in the particular form in which the invention is here clothed, a manual act is also required here on the part of the engineman to energize relay Z. If the engineer does nothing when danger signal 94 is displayed, M will apply the brakes but if he moves push button PB' momentarily into engagement with contact 96, then a circuit is established from wire 90, push button PB', contact 96, wire 97, coil of relay Z, wire 98, to wire 72. This energizes coil of relay Z and picks up armature 100, so that when PB' is moved back to 91 said relay remains energized by current flowing from wire 90, to wire 99, armature 100, wire 101, coil of relay Z and wire 98 to wire 72. When relay Z becomes energized armature 64 is also picked up thereby permitting the train to proceed at a speed up to fifteen miles per hour. Associated with relay Z is also an armature 107 and a partial circuit, from wire 78 to wire 72, consisting of wire 106, armature 107, wire 108, coil of relay Y and wire 85. The function of this partial circuit is to energize Y automatically when passing from danger to caution and requires no intervention by the engineer. It is to be noted that whenever the engineer operates the respective push buttons PB or PB' the respective signal light 81 or 94 will be extinguished during the interval that the respective contact 79 of PB or 91 of PB' is open.

The invention residing in the control exercised by relays R and R' over relays X, Y and Z and the circuit arrangement including circuit closers or push buttons PB and PB' is independent of any particular construction or type of speed controlling means such for instance as are herein disclosed. It will also be evident that relays R and R' can be controlled from the track-way in any suitable manner but a preferred form of the controlling means from the track-way is as follows:

Electron tube E is provided with a grid-filament circuit including coils 14 and 15 in the same manner as in the construction shown in Fig. 1, and electron tube E' is provided with a similar grid-filament circuit including coils 16 and 17, so wound with respect to each other that current flowing in parallel in rails 1 and 2 affects both coils in the same manner, this being in contradistinction to the arrangement of coils 14 and 15 which are so wound that to be effective current must flow in series in rails 1 and 2, that is, down one rail in one direction and up the other rail in the other direction. The grid-filament circuit of tube E' is as follows: coils 16, connection 26, coil 17, wire 28, condenser 29, wire 30, grid 31, filament 32, wire 33 and back to coil 16. 27 is a tuning condenser bridged across the circuit. Track circuits may conveniently be used in connection with tubes E and E' and their grid-filament circuits as follows: traffic rails 1 and 2 are arranged in blocks A, B, C, etc. by means of insulation 3 or otherwise. D is a generator supplying current over line wires to track transformers Tb, Tc, etc. Secondary 400 at the outgoing end of a block supplies current to rails 1 and 2 in series over wires 5 and 6 and Rb is a track relay at the ingoing end of the block and also connected in series with the rails. The current supplied by secondary 400 not only energizes track relay Rb but also induces a current in coils 14 and 15 and their circuit. Secondary 122 is connected to rails 1 and 2 in parallel by means of wire 113, contact 114, armature 115 of track relay Ra of the block in advance, wire 117, center tap of bond 118, down both rails 1 and 2, to center tap of bond 201 and then by wire 119 back to secondary 122. The current of this circuit energizes coils 16 and 17 and their circuit. Now it will be evident that, when a train enters an unoccupied block, as B, and the block in advance is likewise unoccupied, the grid-filament circuits of both tubes E and E' are energized and both grids are rendered negative. This chokes down the current in the plate-filament circuits, including coils of relay R and R', to an intermediate value. Therefore armatures 74 and 68 are both in the right-hand position (Fig. 4). If a train is in the block in advance (A), then track relay Ra will become deenergized, armature 115 will drop and secondary 122 will no longer supply current to the rails of block B. The result of this is that coils 16 and 17 will no longer be energized, the value of the plate-filament current of E' will rise above the intermediate value and relay R' will be so affected that armature 68 will move to the left-hand position (Fig. 4). If a train should already be in block B when a second train enters that block, then coils 14 and 15 will not be energized and consequently the value of the current flowing in the plate-filament circuit of E will rise above the intermediate value and relay R will be so affected that armature 74 will move to the left-hand position (Fig. 4). Furthermore, should for any reason the power supply from 40 fail, as by a leakage or a broken wire, then the value of the current in either or both of the plate-filament circuits of E and E' would fall below the intermediate value and armatures 74 and/or 68 would move to the left-hand position (Fig. 4).

In Fig. 5 is shown a modification of the cab circuits whereby the manual intervention of the engineer is rendered unnecessary and another modification involving a different use of electron tubes E and E' and the track-way circuits. Taking up the latter modification first, Tb indicates a track transformer which is so designed with respect to its iron core that its secondary 401 gives a current wave-shape that has a pronounced third harmonic component as well as a fundamental component. The leads from secondary 401 to the rails are controlled by the track relay of the block in advance, such relay being indicated at Ra. When block A is unoccupied and there is a train, as 4, in block B, then armature 402 of Ra will be up and the following circuit will be established: from secondary 401, to wire 404, armature 402, contact 403, non-inductive resistance 405, wire 406, rail 2, wheels and axles of 4, rail 1, and wire 407 back to secondary 401. When block A is occupied and relay Ra is deenergized armature 402 will be down and the following circuit will be established for a train occupying block B: secondary 401, wire 404, armature 402, contact 408, wire 409, impedance coil 410, wire 406, rail 2, wheels and axles of 4, rail 1 and wire 407 back to secondary 401. If a train is already in block B when a secondary train enters, then no current will pass to the second train. When current passes from secondary 401 via non-inductive resistance 405, its wave-form will be such that it has a fundamental component and a pronounced third harmonic component, whereas if said current flows via impedance coil 410, which is given a high inductance relative to its ohmic resistance, then said third component will be largely suppressed, that is, it will no longer be effective. On the train, pick-up coils 14 and 15 are in series with primary windings of transformers $T^1$ and $T^2$, the secondary of $T^1$ being included in series in the grid-filament circuit of tube E, and the secondary of $T^2$ being included in series with the grid-filament circuit of tube E'. The the grid-filament circuit of tube E' is tuned, by means of condenser 25, to the frequency of the fundamental component of the rail circuit, and the grid-filament circuit of tube E' is tuned by means of condenser 27, to the frequency of the pronounced third harmonic component of the rail circuit. If therefore a train enters block B and it as well as the block in advance are both unoccupied, then the rail current has both a fundamental and a third harmonic component and both tubes E and E' will be influenced to hold armatures 74 and 68 of relays R and R' in the right hand position (Fig. 5). If the block (A) in advance is occupied, then the pronounced third harmonic component is absent and only the fundamental is present and consequently only tube E will be affected. If no current is present in the rails neither tube will be affected. It is thought unnecessary to further describe the features of this part of the invention as it is fully disclosed in application Ser. No. 172,325, filed March 3, 1927. Taking up the second modification shown in Fig. 5, it will be observed that the cab arrangement is substantially the same as that disclosed in Fig. 4, the only difference being that the manual controls PB and PB' together with their circuits are omitted. To make the matter plain, signal 81 is connected directly, by means of wire 80', to wire 78, and relay Y is likewise connected directly, by wire 80'' to wire 78. So also, signal 94 is connected to wire 90 by wire 92' and relay Z is similarly connected by means of wire 92''. The result of this is that when armatures 74 and 68 are both in the right hand position (Fig. 5) signal lamp 71 and relay X are automatically energized, when armature 74 is in the right hand position and 68 in the left hand position (Fig. 5) signal 81 and relay Y are both automatically energized, and when armature 74 is in the left hand position (Fig. 5) signal 94 and relay Z are automatically energized.

In Fig. 6 is shown still another modification of the track-way circuit which can be utilized in place of the track equipment of Fig. 1. Here the traffic rails are normally supplied with current from battery 420 through back contacts 421 and 422 of relay 423, which latter is located at the outgoing end of the block and is normally deenergized by reason of the fact that its circuit is controlled by back contact r' of local block relay Rb and by front contact r of relay Ra of the block in advance. When a train enters block B from the right, and blocks A and B are both unoccupied, relay 423 becomes energized by the dropping of armature r' of relay Rb. The lifting of the armatures of relay 423 disconnects battery 420 from the rails and closes a circuit from battery 424, along wire 425, armature 426, wire 427, motor 428, wire 429, armature 430 and wire 431 back to battery 424 thereby driving motor 428. The shaft of motor 428 carries a commutator or interrupter so that when relay 423 is energized and motor 428 running, interrupted current will flow from battery 424, along wire 425, armature 426, wire 427, commutator 432, wire 433, armature 434, wire 435, rail 2, train-shunt, rail 1, wire 436, armature 437, wire 438, wire 429, armature 430 and wire 431 back to battery 424. The interrupted current thus flowing in the rails induces a current in coils 14 and 15 (Fig. 1) and, so long as this current flows M will be energized. If block A is occupied when a train enters block B, then relay Ra will be deenergized and the circuit through relay 423 will not be closed and the interrupted current will not be supplied to the rails. If a train is already in the block when the second train enters, then said second train will receive no current, the first train absorbing it all.

I claim:

1. In a train control system: a train, a train-carried translating device, and two opposed sources of power, the voltage of one of which is determined by the speed of the train and the supplied voltage of the other of which is controlled by traffic conditions, to control said translating device.

2. In a train control system: a train, a train-carried translating device, circuit means for said translating device, two opposed sources of power, included in said circuit means, the voltage of one of which power sources is determined by the speed of the train, and traffic-controlled means to vary the circuit means to thereby control the voltage supplied by the other power source.

3. In a train control system: a train, an electron tube having a grid, and means to control the potential of the grid including: two opposed sources of power, the voltage of one of which is determined by the speed of the train.

4. In a train control system: a train, an electron tube having a grid, and means to control the potential of the grid including: two opposed sources of power, the voltage of one of which is determined by the speed of the train and the supplied voltage of the other of which is controlled by traffic conditions.

5. In a train control system: a train an electron tube having a plate, a grid and a filament, a grid-filament circuit, and two opposed sources of power in said grid-filament circuit, the voltage of one of which is determined by the speed of the train.

6. In a train control system: a train, an electron tube having a plate, a grid and a filament, a grid-filament circuit, and two opposed sources of power in said grid-filament circuit, the voltage of one of which is determined by the speed of the train, and the supplied voltage of the other of which is controlled by traffic conditions.

7. In a train control system: a train, an electron tube having a plate, a grid and a filament, a grid-filament circuit, two opposed sources of power in said grid-filament circuit, the voltage of one of which is determined by the speed of the train, a plate-filament circuit, and a translating device included in said plate-filament circuit.

8. In a train control system: a train, an electron tube having a plate, a grid and a filament, a grid-filament circuit, two opposed sources of power in said grid-filament circuit, the voltage of one of which is determined by the speed of the train, and the supply voltage of the other of which is controlled by traffic conditions, a plate-filament circuit, and a translating device included in said plate-filament circuit.

9. In a train control system: a train, a train-carried translating device, circuit means for controlling said translating device, two sources of power, included in said circuit means, the voltage of one of which power sources is determined by the speed of the train, and traffic-controlled means to vary the circuit means to thereby control the voltage supplied by the other power source.

10. In a train control system: a train, an electron tube having a grid, and circuit means to control the potential of the grid including: two sources of power, the voltage of one of which is determined by the speed of the train.

11. In a train control system: a train, a train-carried translating device, two sources of power for controlling said translating device, the voltage of one of which power sources is determined by the speed of the train, traffic controlled means to vary the voltage supplied by the other source, and manually operated means to render active the control of said two sources of power over the translating device under certain traffic conditions.

12. In a train control system: a trackway, a train, a train-carried translating device continuously responsive to traffic conditions of said trackway, a second train-carried translating device controlled by two sources of power, the voltage of one of which is determined by the speed of the train and the supplied voltage of the other of which is controlled by the first-mentioned translating device, and two indicating devices on the train, one of said indicating devices controlled by the first-mentioned translating device and the second indicating device controlled by the second translating device.

13. In a train control system: a trackway, a train, two train-carried translating devices, one responsive to traffic conditions of the trackway, and the other responsive to a control derived from two sources of power, the voltage of one of which is determined by the speed of the train and the applied voltage of the other of which is determined by the first-mentioned translating device, and a train indicating device controlled by the second-mentioned translating device.

14. A continuous indication code system for the control of railway vehicles, comprising a stretch of track divided into insulated blocks, a closed track circuit for each block, a normally inactive rotary motor and a source of electrical energy adjacent each block junction, circuit controllers operated by said motors adapted to connect said sources of energy periodically across the rails at the exit ends of the respective blocks to cause current impulses arranged in a predetermined code to flow through the rails when the motors are operating, means for setting the motors in operation when and only when the respective track circuits immediately in rear thereof are short circuited or interrupted, in combination with a vehicle traveling on the track having a translating device responsive to the current impulses and code responsive mechanism acting in conjunction with the translating device to effect a clear indication so long as said code is being received.

15. A continuous train control system including: traffic rails arranged in blocks, trackway apparatus operating under proceed traffic conditions to supply interrupted current across the traffic rails at the exit end of the block, a train, a circuit controller on the train capable of assuming different positions, and train carried apparatus, in an inductive relation with the traffic rails, including means to cause said circuit controller to assume relatively quickly one position but relatively slowly another position to thereby retain the circuit controller in the one position as long as said interrupted current is supplied to the traffic rails.

16. A continuous train control system including: traffic rails arranged in blocks, trackway apparatus operating under proceed traffic conditions to supply interrupted current across the traffic rails at the exit end of the block, a train, a circuit controller on the train capable of assuming different positions, and train carried apparatus, in an inductive relation with the traffic rails, including means that quickly assume one condition and relatively slowly another condition to thereby retain the circuit controller in a given position as long as said interrupted current is supplied to the traffic rails.

17. A continuous train control system including: traffic rails arranged in blocks, trackway apparatus operating under proceed traffic conditions to supply interrupted current across the traffic rails at the exit end of the block, a train, a circuit controller on the train capable of assuming one or another of two circuit closing positions, and train carried apparatus, in an inductive relation with the traffic rails, including means to cause said circuit controller to assume relatively quickly one circuit closing position but relatively slowly the other circuit closing position to thereby retain the circuit controller in the one position as long as said interrupted current is supplied to the traffic rails.

ARBA G. WILLIAMSON.